United States Patent [19]

Tanner

[11] 4,153,303
[45] May 8, 1979

[54] MULTIPART HUB ASSEMBLY
[75] Inventor: Robert G. Tanner, St. Charles, Mo.
[73] Assignee: Arundale, Inc., St. Louis, Mo.
[21] Appl. No.: 876,766
[22] Filed: Feb. 10, 1978
[51] Int. Cl.$^2$ .............................................. B60B 5/02
[52] U.S. Cl. ........................ 301/63 PW; 152/323; 152/379.1; 301/63 DD
[58] Field of Search ............. 152/375, 382, 384, 396, 152/379, 402, 323; 301/10, 11, 12, 13, 18, 98, 63 PW, 63 DD, 63 DS, 63 R; 16/45 R

[56] References Cited
U.S. PATENT DOCUMENTS

| | | | |
|---|---|---|---|
| 3,578,812 | 5/1971 | Taussig | 301/63 PW |
| 3,695,728 | 10/1972 | Haussels | 301/63 PW X |
| 3,894,776 | 7/1975 | Black | 301/63 PW X |
| 3,952,786 | 4/1976 | Kreling et al. | 301/63 PW X |

Primary Examiner—Joseph F. Peters, Jr.
Assistant Examiner—Gene A. Church
Attorney, Agent, or Firm—Richard J. Sher

[57] ABSTRACT

A multipart plastic hub assembly includes a pair of hub members each having an annular inner rim portion, a tire support portion, and a radially extending web portion therebetween. The inner rim of each hub member is notched at circumferentially-spaced intervals therearound in order to facilitate radial flexure thereof and radially inwardly directed detents are positioned on the axial outermost end of each rim portion. A tire of rubber or the like is placed between the two hub members and a center core is inserted through each of the inner rims. The hub members are then brought together in abutting relationship so that the tire is captively retained within the tire support portions and the inwardly directed detents are received in annular grooves formed in the center core adjacent respective ends thereof, to thereby form and retain the integrity of a composite wheel assembly.

7 Claims, 4 Drawing Figures

U.S. Patent May 8, 1979 4,153,303
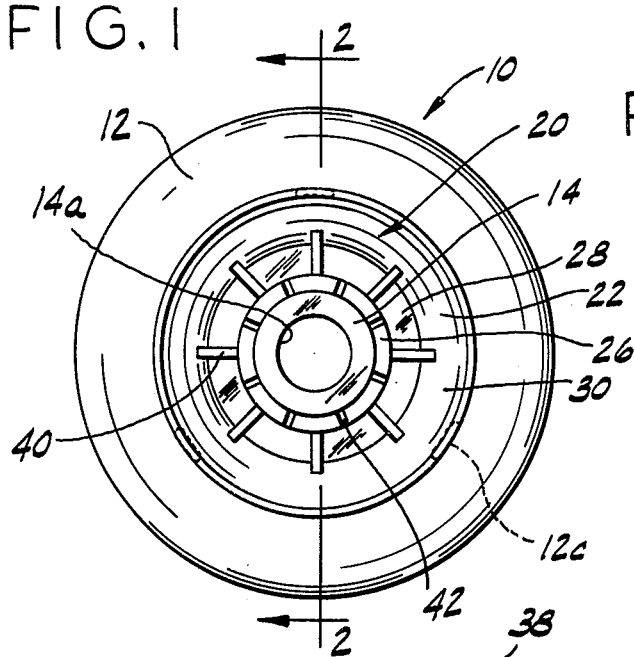
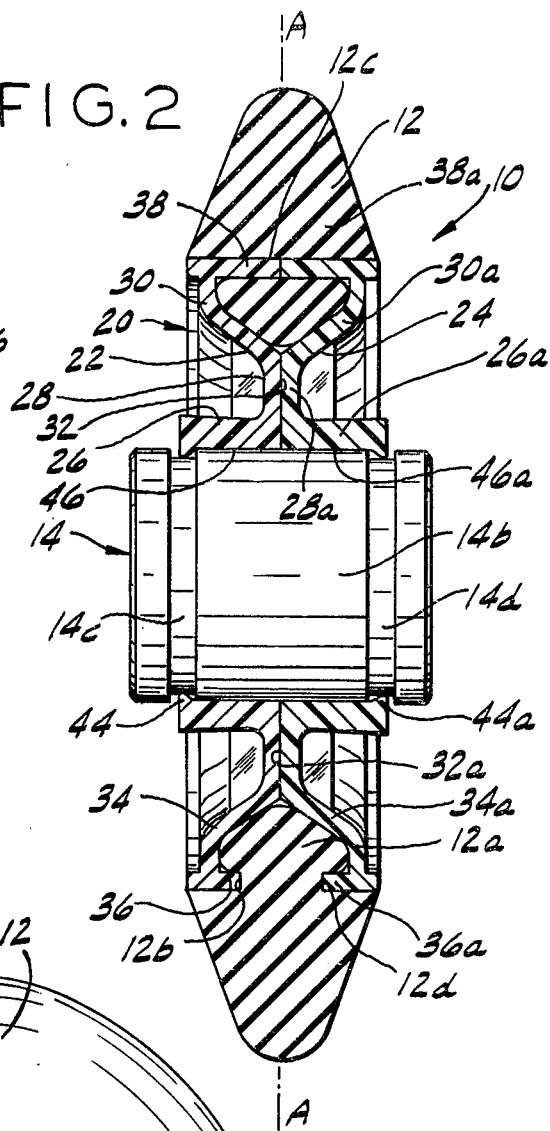

14,153,303

MULTIPART HUB ASSEMBLY

BACKGROUND AND SUMMARY OF THE INVENTION

Plastic hubs are utilized in composite wheel assemblies to produce durable, lightweight, low cost wheels for numerous applications. Such wheels usually include an outer tire of rubber or the like for absorbing shock and imparting skid resistance to the assembly, and an inner bearing of metal or the like for added strength and wear life. Generally two approaches have been taken for incorporating plastic hubs into multipart wheels. One method devised was to separately mold single-piece rigid hubs for later assembly. Separately molded hubs are desirable in that they can be easily and cheaply manufactured at high speeds using various types of plastics. However, the one piece preformed plastic hubs have several disadvantages. First, the hub and tire must be precisely toleranced to permit facile assembly, yet also provide for firm retention of the tire on the hub under full load conditions. Usually the tire is forced fitted over the hub; however, the fact that the tire must be stretched over the hub necessarily limits the ability of the tire and hub to form a secure assembly. Also, it is difficult to incorporate locking structure which will aid in holding the tire on the hub and prevent relative movement therebetween, both along the rotational axis and in the lateral direction.

Another prior art method for producing the composite wheel involves molding the hub in situ between a concentrically positioned tire and bearing. By this method, the hub can be firmly molded around the tire thereby assuring a secure assembly. To further guarantee a durable assembly, intricate interlocking structure may be used, such as lateral projections in the hub extending into corresponding tire grooves, since the fluid plastic will readily fill the space defined between the mold and tire. However, the molding method is unduly expensive in that a great deal of labor time is required to individually place bushings and tires into the mold and insure that they are properly positioned. Also, if any of the parts are improperly positioned, or if the particular molding cycle is faulty in any respect, the entire assembly must be scrapped.

According to the present invention, a composite wheel assembly includes a multipart hub fabricated of a pair of hub members held in abutting relationship by the engagement thereof with a common center core or bushing. The hub members may be formed of a wide range of plastics, including nylon, ABS, and polystyrene. Each of the hub members includes an inner rim portion which is notched at the axial outermost end thereof at circumferentially-spaced intervals therearound in order to facilitate the radial flexure thereof. Further, each of the outermost ends of the inner rim portions includes radially inwardly directed detents thereon. When a common cylindrical center core or bearing member is inserted in an axial outward direction through the hub member pair, the detents on each respective rim portion engage the center core and are flexed radially outwardly. As the center core is inserted further through the inner rim the respective detents snap into and engage with an annular groove formed on the exterior surface of the center core adjacent each end thereof. The relationship of the hub member pair with the annular grooves on the center core is such that when the detents snap into and engage the respective annular groove, the hub members will be positioned in abutting relationship with the mass of the hub equally distributed about the center line of the center core and composite wheel assembly. The constant and uniform pressure created by the bushing by the outward flexing of the inner rim portions helps to maintain the concentricity of the composite wheel assembly and minimizes the possibility that the wheel assembly will become misaligned during use. When assembled, the tire is held centrally between the two hub members by a tire support portion carried by each hub member and the tire is formed to accept laterally extending clincher beads on each of the hub members to further maintain the tire in place on the hub. Anti-rotation lugs on the clincher beads extend through slots in the tire to prevent slippage of the tire about the hub during use.

It is, therefore, the main object of the invention to provide a unique multipart hub assembly which permits the construction of a durable wheel assembly in both a simple and inexpensive manner.

BRIEF DESCRIPTION OF THE DRAWINGS

The invention will be more readily understood upon a reading of the following detailed description of the preferred embodiment in conjunction with the drawings wherein:

FIG. 1 is a side elevation of an entire wheel assembly embodying the unique multipart hub assembly of the instant invention;

FIG. 2 is a cross section of the wheel assembly taken along line 2—2 of FIG. 1;

FIG. 3 is a partial cross section of one of the hub members prior to assembly; and FIG. 4 is an exploded perspective view of the two hub members which form the multipart hub and a portion of the tire therebetween.

DESCRIPTION OF THE PREFERRED EMBODIMENT

With reference to the drawing, wherein like reference numerals depict the same structures in the various figures, there is shown a wheel assembly 10, generally comprised of an annular outer tire 12 formed of rubber or the like, an inner annular center core or bearing member 14 of metal or the like, and a multipart plastic hub 20 intermediate tire 12 and center core 14.

Multipart hub 20 consists of a pair of juxtaposed hub members 22 and 24. Hub members 22 and 24 are formed of molded plastic and according to the preferred embodiment are identical and therefore may be fabricated in the same mold in order to reduce the cost of manufacture. Hub member 22 is provided with an annular inner rim portion 26, which is formed substantially cylindrical with the axis of rotation thereof, which is coincident with the axis of rotation of wheel assembly 10. Extending radially outwardly from the axial inner end of rim portion 26 is a web portion 28. Web portion 28 supports an outer annular tire support portion 30 and integrally maintains tire support portion 30 in a concentric relationship to inner rim portion 26. Web portion 28 has an inner side surface 32 thereof situated along the center line A—A of the wheel assembly 10 as shown in FIG. 2. Tire support portion 30 of hub member 22 includes an annular arcuate portion 34 and a laterally extending clincher bead 36 which extends inwardly from the outer edge of arcuate portion 34 and is adapted to mate with and clinch tire 12 as will be explained in greater detail hereinafter. Circumferentially spaced anti-rotation lugs 38 extend laterally inwardly from clincher bead 36 to secure tire 12 from relative rotational movement with hub 20 as will also be explained hereinafter.

Hub member 24 is identical to hub member 22 according to the preferred embodiment and includes an inner rim portion 26a, a radially outwardly extending web portion 28a, and a tire support portion 30a integrally maintained in concentric relationship with inner rim portion 26a by web 28a. Tire support portion 30a likewise includes arcuate portion 34a and an annular laterally inwardly extending clincher bead portion 36a. Further, hub member 24 also includes circumferentially spaced anti-rotation lugs 38a extending laterally inwardly from clincher bead 36a. As best seen in FIGS. 1 and 4, a plurality of circumferentially-spaced, integral reinforcing spokes 40 and 40a extend between respective inner rim portions 26, 26a and respective tire support portions 30, 30a in order to reinforce respective web portions 28, 28a and to help maintain the concentricity between the tire support portions 30, 30a and the respective rim portions 26, 26a.

In order to facilitate the radial flexure of inner rim portions 26 and 26a, the axial outermost end of each of the rim portions is notched at circumferentially spaced intervals therearound as indicated by the numerals 42 and 42a respectively. Further, at the axial outermost end of each of the rim portions 26 and 26a there are provided between the notched areas 42, 42a respectively, radially inwardly directed detents 44 and 44a respectively.

Tire 12 is separately molded from hub members 22 and 24 but must be designed to accept and mate with clincher beads 36 and 36a and anti-rotation lugs 38 and 38a. To this end clincher grooves 12b and 12d are formed in each side of tire 12. Also a locking bulb 12a is formed into tire 12 below clincher grooves 12b and 12d to conform to the interior of arcuate portions 34 and 34a as locking bulb 12a will be completely enclosed between the arcuate portions 34 and 34a and clincher beads 36 and 36a of respective hub members 22 and 24, after assembly. It should be understood that modifications could be made to the outer tire support portions 30, 30a of the respective hub members 22,24 if corresponding changes are made to tire 12 in order to insure that tire 12 is securely engaged by hub members 22 and 24.

Bearing member 14 is provided with an inner cylindrical surface 14a and a concentric outer cylindrical surface 14b which is of a diameter which will ultimately firmly engage the interior surfaces 46 and 46a of rims 26 and 26a respectively. A pair of annular grooves 14c and 14d are formed in the outer surface 14b of bearing member 14 at locations adjacent each end thereof. Grooves 14c and 14d are located so that the detents 44 and 44a of respective hub members 22 and 24 will snap into and engage respective grooves 14c and 14d when inner surface 32 of web portion 28 engages inner surface 32a of web portion 28a along the center line A—A of wheel assembly 10. The depth of grooves 14c and 14d is chosen such that the respective detents 44 and 44a will be securely retained within the respective grooves 14c, 14d and a constant radial outward flexure is maintained on rim portions 46 and 46a respectively, in order to maintain a force on hub members 22 and 24 which will tend to force web portions 28 and 28a together and which will maintain tire support portions 30 and 30a in tight and secure engagement with tire 12.

Assembly

Wheel assembly 10 is assembled in the following manner. Bearing member 14 is inserted in an axial outward direction into the bore defined by inner surface 46 of innter rim portion 26. The initial contact between detents 44 and the end portion of bearing member 14 will cause the axial outermost end of inner rim 26 to flex radially outward to allow the further insertion of bearing member 14 within rim 26. When groove 14c reaches the position of detents 44, the detents will snap into and engage with groove 14c thus preventing further insertion of bearing member 14. Tire 12 is then joined with hub member 22 whereby proper alignment is assured by fitting clincher bead 36 into the clincher groove 12b of tire 12 and the anti-rotation lugs 38 through slots 12c formed in tire 12. The locking bulb 12a of tire 12 is automatically received by arcuate portion 34 when clincher bead 36 is fully seated within clincher groove 12b. Next, hub member 24 is pushed onto bearing member 14 whereby the radial outward flexure of the axial outermost end of inner rim 26a permits the insertion of bearing member 14 therethrough until detents 44a reach the position of groove 14d and thereafter snap into and engage with groove 14d to prevent further relative movement between hub member 24 and bearing member 14. Hub member 24 is designed such that detents 44a will snap into groove 14d when web portions 28 and 28a of respective hub members 22 and 24 reach abutting relationship along with the circumferentially-spaced anti-rotation lugs 38 and 38a extending through tire slots 12c. Also, when assembled, clincher bead 36a of hub member 24 will firmly engage clincher groove 12 of tire 12. After assembly, both inner rim portions 26 and 26a will be flexed slightly outward by the engagement thereof with bearing member 14, thus insuring the constant abutment between web portions 28 and 28a and the firm and secure engagement of tire 12 between hub members 22 and 24 which members combine to form hub 20. The forces generated by loads acting radially against tire 12 will not tend to separate hub members 22 and 24, but to the contrary will actually aid in holding the hub members together. It is again noted that the mating engagement between groove 14c, 14d and detents 44, 44a respectively insures that the positioning of hub 20 and tire 12 with respect to bearing 14 will create an equal mass distribution along center line A—A of composite wheel assembly 10. It can therefore be seen that a unique multipart hub assembly has been disclosed which provides a durable wheel assembly which may be manufactured in a simple and inexpensive manner.

It is evident that numerous modifications may be made to the preferred embodiment of the invention described hereinabove without substantially departing from the spirit and scope thereof; for example, anti-rotation lugs 38a may be eliminated and instead, anti-rotation lugs 38 lengthened to abut directly with the opposing clincher bead 36a. Therefore, it is specifically requested that the invention be determined solely by the language of the following claims.

I claim:

1. A multipart hub and core assembly for use in the manufacture of a composite wheel including a tire, a hub and a center core; said hub and core assembly comprising:

a first hub member having a first annular inner rim portion concentric with the axis of rotation of the wheel; a first web portion extending radially outward from the axial inner end of said first rim portion and a first tire support portion carried by said first web portion and located concentrically with said first rim portion;

a second hub member having a second annular rim portion concentric with the axis of rotation of the wheel; a second web portion extending radially outward from the axial inner end of said second rim portion and a second tire support portion carried by said second web portion and located concentrically with said second rim portion;

the axial outermost ends of each of said first and second rim portions being notched at circumferentially spaced intervals therearound in order to facilitate radial flexure thereof and having radially inwardly directed detents thereon;

a substantially cylindrical, inner core including a first annular groove in the exterior surface thereof located adjacent one end thereof and a second annular groove in the exterior surface thereof located adjacent the opposite end thereof;

said core being insertable within said first rim portion to thereby forceably flex said first inner rim portion radially outwardly and said first hub member being held in place on said core by the radially inwardly directed force of said detents on said first rim portion engaged within said first groove; and said core being insertable within said second rim portion to thereby forceably flex said second rim portion radially outwardly, and said second hub member being held in place on said core, wherein said first and second web portions are in abutting relationship, by the radially inwardly-directed force of said detents on said second rim portion engaged within said second groove; and said first and second tire support portions being formed to conform to and hold the radially innermost portion of such tire when said web portions are in said abutting relationship.

2. A multipart hub assembly as specified in claim 1 and further characterized by:
each of said tire support portions including an annular, laterally-inwardly extending clincher bead means for mating engagement with clincher grooves located on each side of such tire.

3. A multipart hub assembly as specified in claim 2 and further characterized by:
at least one of said clincher beads include circumferentially-spaced, anti-rotation lug means for projecting through lateral slots formed through such tire.

4. A multipart hub assembly as specified in claim 3 and further characterized by:
both of said clincher beads include circumferentially-spaced, anti-rotation lug means for projecting through lateral slots formed through such tire; and
said anti-rotation lug means on said first hub member corresponding in location to respective anti-rotation lug means on said second hub member so that a pair of anti-rotation lug means extends through each slot.

5. A multipart hub assembly as specified in claim 1 and further characterized by:
said center core being a metal bearing means.

6. A multipart hub assembly as specified in claim 1 and further characterized by:
the mass of the hub assembly is equally distributed on each side of the wheel center line.

7. A multipart hub assembly as specified in claim 1 and further characterized by:
each of said first and second hub members including circumferentially-spaced, integral, reinforcing spokes extending between a respective inner rim portion and a respective tire support portion thereof along the exterior surface of a respective web portion thereof.

* * * * *